United States Patent
Wimmer et al.

(10) Patent No.: US 9,699,634 B2
(45) Date of Patent: Jul. 4, 2017

(54) METHOD AND APPARATUS FOR EMERGENCY CONTACT MANAGEMENT

(71) Applicant: ROAD ID, INC., Erlanger, KY (US)

(72) Inventors: Edward Wimmer, Lakeside Park, KY (US); Patrick Rabice, Austin, TX (US)

(73) Assignee: ROAD ID, INC., Erlanger, KY (US)

( * ) Notice: Subject to any disclaimer, the term of this patent is extended or adjusted under 35 U.S.C. 154(b) by 51 days.

(21) Appl. No.: 14/293,410

(22) Filed: Jun. 2, 2014

(65) Prior Publication Data

US 2015/0350860 A1 Dec. 3, 2015

(51) Int. Cl.
*H04W 4/22* (2009.01)
*H04W 4/02* (2009.01)
*H04W 64/00* (2009.01)

(52) U.S. Cl.
CPC .......... *H04W 4/22* (2013.01); *H04W 4/027* (2013.01); *H04W 64/006* (2013.01)

(58) Field of Classification Search
CPC ......... H04W 4/22; H04W 64/00; H04W 4/02; H04W 64/006; H04W 4/027; H04W 76/007; H04W 76/005; H04W 76/021; H04W 76/025; H04W 8/04; H04W 8/14; H04W 4/021; H04W 4/025; H04W 40/20; H04W 8/183; H04W 88/02; H04W 4/12; H04W 88/00; H04M 3/5116
See application file for complete search history.

(56) References Cited

U.S. PATENT DOCUMENTS

| | | | | |
|---|---|---|---|---|
| 7,312,712 | B1 * | 12/2007 | Worrall | G06Q 10/06 340/573.4 |
| 9,154,931 | B2 * | 10/2015 | Diamond | H04W 4/22 |
| 2002/0004382 | A1 * | 1/2002 | Cox | H04M 3/42 455/414.3 |
| 2005/0075116 | A1 * | 4/2005 | Laird | A61B 5/04 455/404.1 |
| 2008/0039048 | A1 * | 2/2008 | Turri | H04W 4/22 455/404.1 |
| 2008/0082263 | A1 * | 4/2008 | Chauncey | G01S 19/49 701/469 |
| 2011/0210835 | A1 * | 9/2011 | Kondo | G08G 1/205 340/425.5 |
| 2011/0223895 | A1 * | 9/2011 | Wagda | H04W 4/20 455/414.2 |
| 2011/0231493 | A1 * | 9/2011 | Dyor | G06Q 10/0631 709/206 |
| 2011/0234406 | A1 | 9/2011 | Young et al. | |

(Continued)

*Primary Examiner* — Meless Zewdu
(74) *Attorney, Agent, or Firm* — Sand & Sebolt (57) ABSTRACT

A system and method for tracking a person is presented. A system includes an electronic device to be carried by a person that is used to notify one or more remote users that the person is to begin a journey from a starting point to a remote point. The electronic device can detect that the person has not moved for a predetermined time period a predetermined distance. When this happens, the electronic device sends non-movement messages to the one or more remote users informing them that the person has not move for a predetermined time period a predetermined distance. The electronic device provides a warning message that the non-movement messages will be sent and sends them if there was no response to the warning message.

23 Claims, 12 Drawing Sheets

(56) References Cited

U.S. PATENT DOCUMENTS

| | | | |
|---|---|---|---|
| 2011/0279263 A1* | 11/2011 | Rodkey | G08B 25/002 340/539.13 |
| 2011/0298611 A1* | 12/2011 | Shelton | G08B 5/222 340/539.11 |
| 2012/0035427 A1 | 2/2012 | Friedman et al. | |
| 2012/0122420 A1* | 5/2012 | Franz | H04W 4/14 455/404.2 |
| 2013/0211291 A1 | 8/2013 | Tran | |
| 2013/0214925 A1* | 8/2013 | Weiss | G08B 25/001 340/539.11 |
| 2013/0292622 A1* | 11/2013 | Waite | E04F 11/1804 256/65.01 |
| 2014/0191863 A1* | 7/2014 | Ten Kate | A61B 5/1116 340/539.12 |

\* cited by examiner

METHOD AND APPARATUS FOR EMERGENCY CONTACT MANAGEMENT

BACKGROUND OF THE INVENTION

1. Field of Invention

The current invention relates generally to apparatus, systems and methods for continued tracking. More particularly, the apparatus, systems and methods relate to notifying contacts that one is to be traveling on a route. Specifically, the apparatus, systems and methods provide for notifying contacts that one has gone exercising and has unexpectedly not moved for an amount of time while traveling a route.

2. Description of Related Art

Today people enjoy a wide variety of outdoor activities such as walking, running, hiking, jogging, biking and the like. Many of these types of activities are traveled along routes of various lengths and may cover some distance. While enjoying these types of activities, one may become injured by twisting an ankle on an uneven surface and that may make it difficult to finish a route or make a person unable to return to a starting location. Alternatively, a person traveling a route in a remote location can have a medical condition that causes them to pass out in the middle of a journey. Even more scary, is that one may be attacked/robbed by someone with bad intentions while travelling along a specific exercise path and may even be knocked unconscious and rendered immobile. What is needed is a better way for one to enjoy walking, running, hiking, jogging, and the like while making these types of activities safer and making them more enjoyable by creating a sense of security/peace of mind.

SUMMARY

One aspect of the preferred embodiment of the invention may include a system for tracking a person. A system includes an electronic device to be carried by the person to be tracked and is used to notify one or more remote users that the person is to begin a journey from a starting point to a remote point. The electronic device can detect that the person has not moved for a predetermined time period or along a predetermined distance. When this happens, the electronic device sends non-movement messages to the one or more remote users informing them that the person has not moved for a predetermined time period or along a predetermined distance. The electronic device provides a warning message to the person being tracked that the non-movement messages will be sent and sends them if there was no response to the warning message.

Another aspect of this configuration of the preferred embodiment is that it includes a method of following a person traveling a route from a start point to an end point. The method begins by sending a start message to one or more people indicating that the person is beginning the route and indicating how long the trip should take. A detection can be made that the person has not moved at least a distance along the route in a time interval. If that detection is made, a non-movement message is then sent to the one or more people indicating that the person has not moved the distance in the time interval along with the person's location. Prior to sending the non-movement message the method can provide an option for the person to cancel the non-movement message to the one or more people. The method may also track the person as discussed above after the non-movement message is sent in case there has been foul play so that friends and family can continue to receive updates of where the person is located. In some embodiments, the method may be performed in a handheld electronic device.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
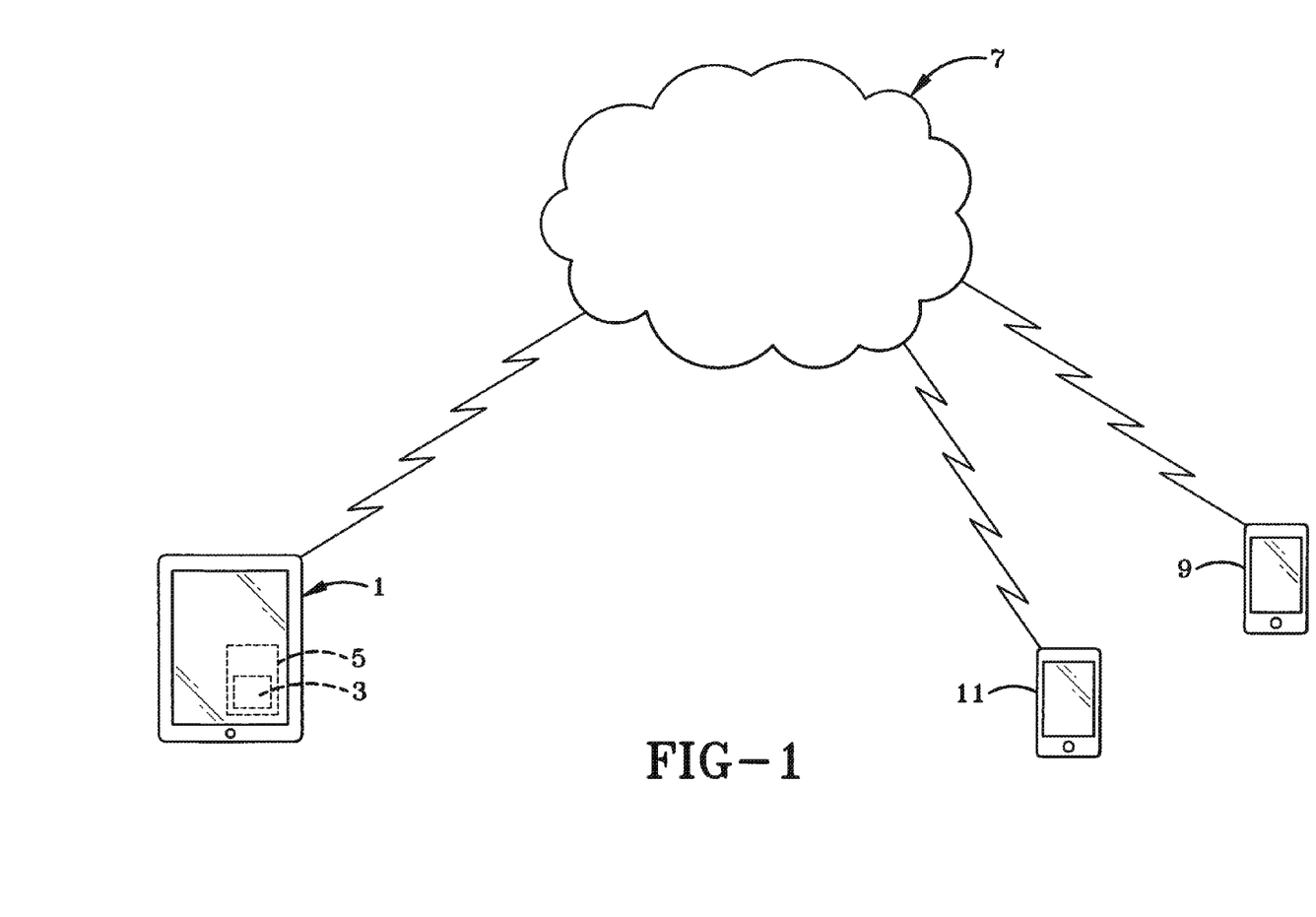
FIG. 1 illustrates a sample embodiment of a system to track a person traveling a path from a start location to an end location.

FIG. 1 illustrates the preferred embodiment of an electronic device 1 that executes a Road Identification (ID) application 3. As discussed in detail below, the Road ID application 3 can be used to track a person as they travel a route while running, walking, biking, jogging, skiing or performing another activity as they travel from a starting point to another point. The electronic device 1 can be almost any device capable of executing software instructions. For example, it can be a smart phone, iPad, laptop computer and the like. The electronic device 1 can implement the Road ID application by executing software instructions and/or implementing instructions in hardware in a processor 5 and/or other logic.

"Logic", as used herein, includes but is not limited to hardware, firmware, software and/or combinations of each to perform a function(s) or an action(s), and/or to cause a function or action from another method, and/or system. For example, based on a desired application or needs, logic may include a processor 5 such as a software controlled microprocessor, an application specific integrated circuit (ASIC), a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

In the sample embodiment, the electronic device 1 is connected to a wireless network 7. In other embodiments, the wireless network 7 can include other networks such as a wired network or other wireless cellular networks and the like. As discussed further below, the electronic device 1 can send email messages and/or SMS (short message service) messages and other kinds of messages to remote devices 9, 11 owned by family and friends. These family and friends may wish to track the progress of a person carrying the electronic device while that person travels a route, or may want to be notified if the owner of the electronic device 1 has not moved for a predetermined amount of time after beginning an activity during which the person moves from one location to another location.

Figure 2:
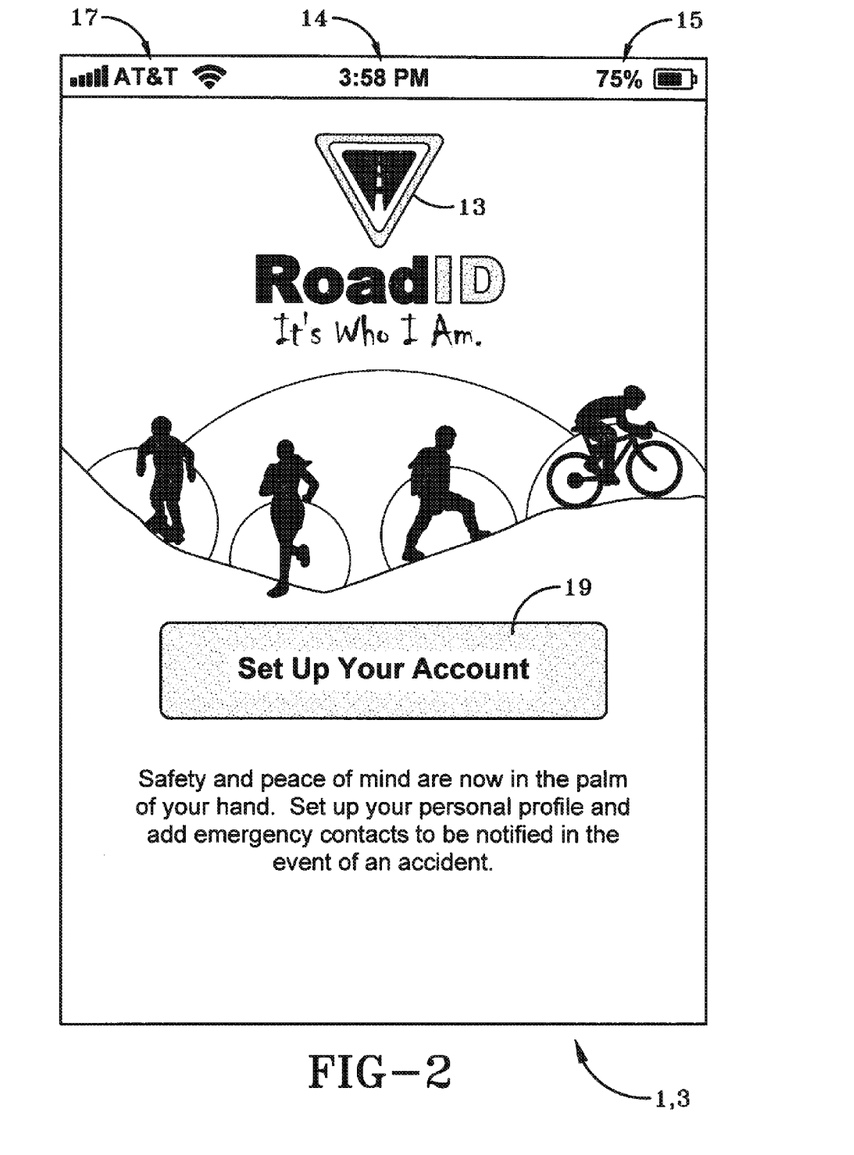
FIG. 2 illustrates an example welcome screen of a Road ID application that is used to create a user account.

Having introduced the electronic device 1 running the Road ID app 3, its use and operation are now described. FIG. 2 illustrates an example screen view of what the Road ID application 3 would display on the electronic device 1 when the application 3 is activated after begin downloaded to the device 1. This screen includes a Road ID logo 13, a current time indicator 14, a battery life indicator 15 of the electronic device 1, and a wireless signal strength indicator 17 that indicates the strength of a communication link between the wireless device and the network 7. A "set up your account" button 19 is displayed and can be pressed by a user of the device 5 to create a Road ID account. Alternatively, the application can be voice activated after being downloaded.

Figure 3:
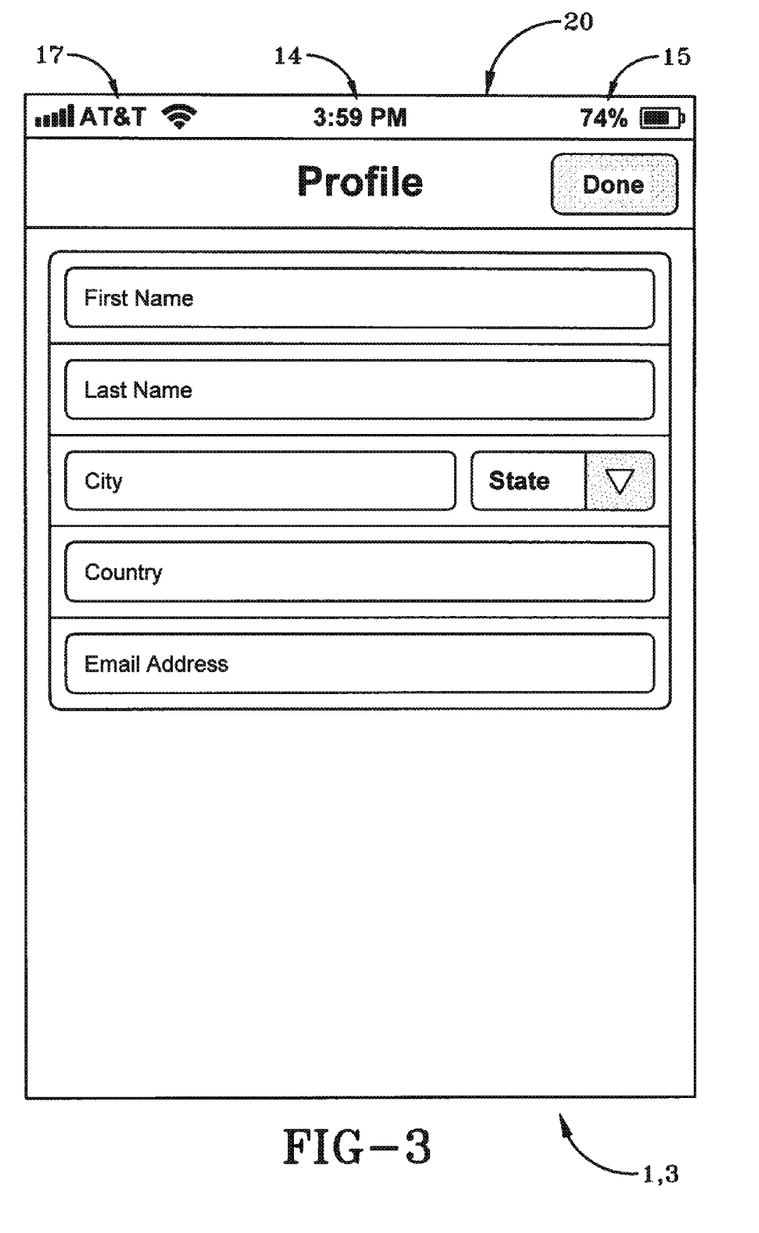
FIG. 3 illustrates an example screen used to enter a person's profile when creating an account for the Road ID application that is used to track the person along the route.

Upon voice activation or activation by pressing button 19, the Road ID Application 3 will display on the electronic device 1 a menu screen 20 similar to the one on the screen 20 illustrated in example FIG. 3. This screen 20 provides a way for a user to enter their first and last name, city, state, country, email and other information needed to create an account in the example illustrated fields.

Figure 4:
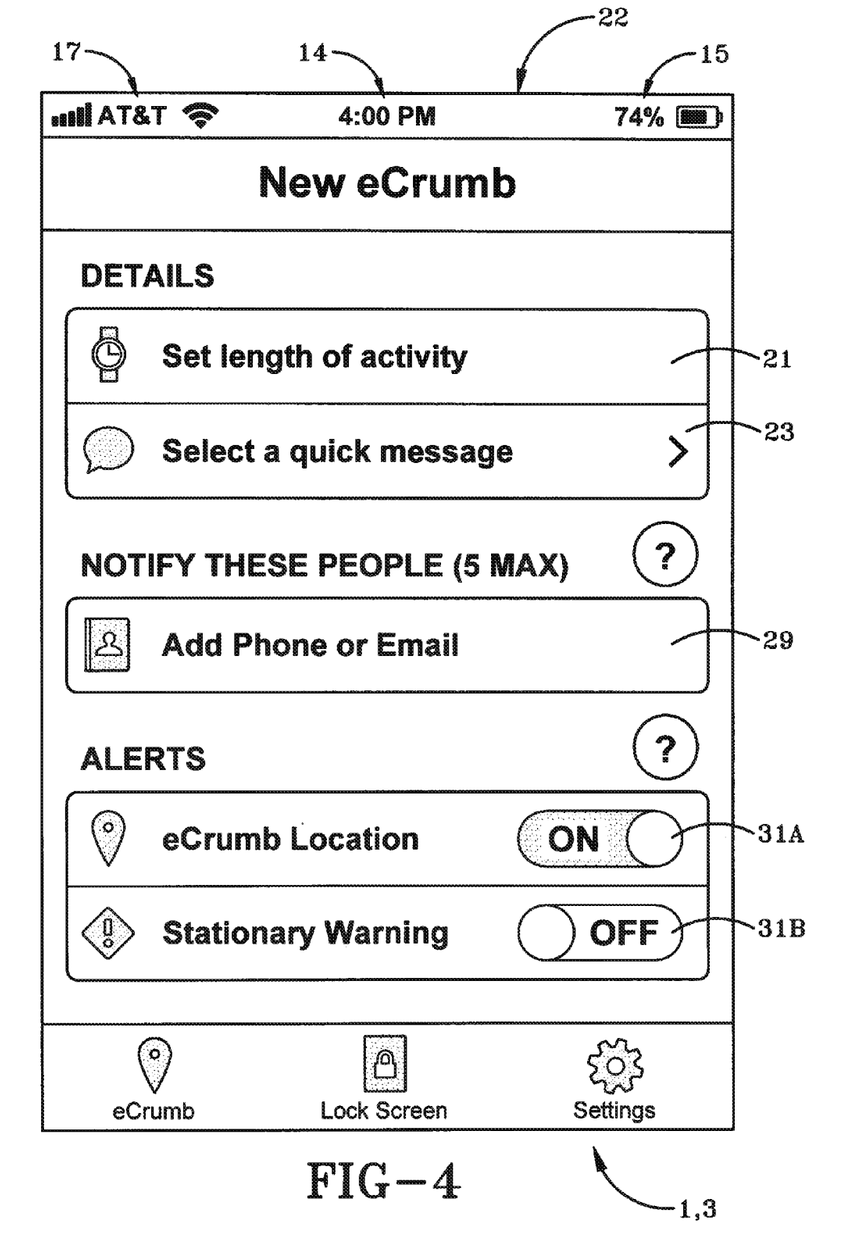
FIG. 4 illustrates an example screen used to set up tracking and stationary alarm features of the Road ID application that is used to track the person along the route.
Figure 5:
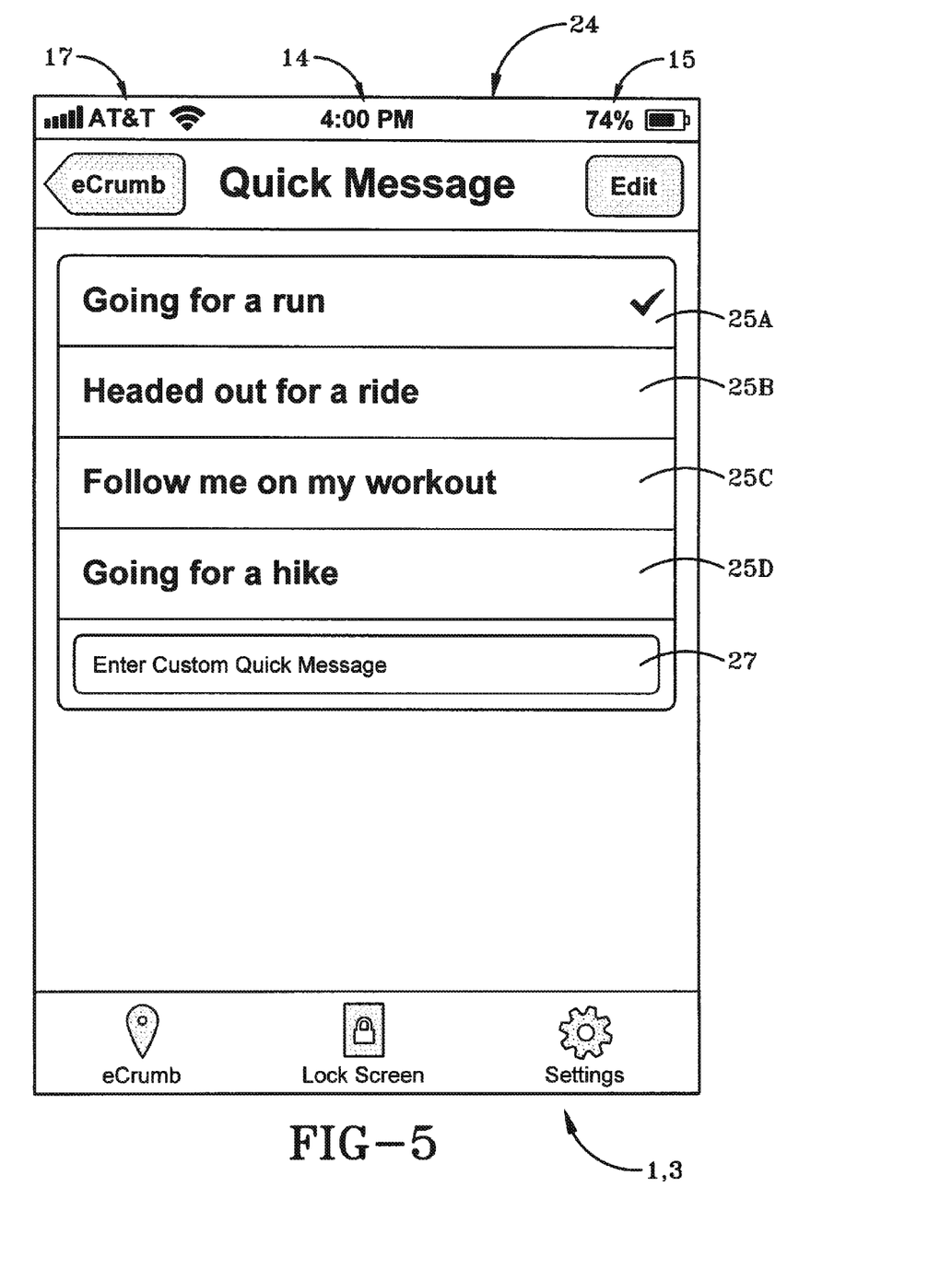
FIG. 5 illustrates an example screen used to generate a message with the Road ID application that the person is going to begin traveling the path.
Figure 6:
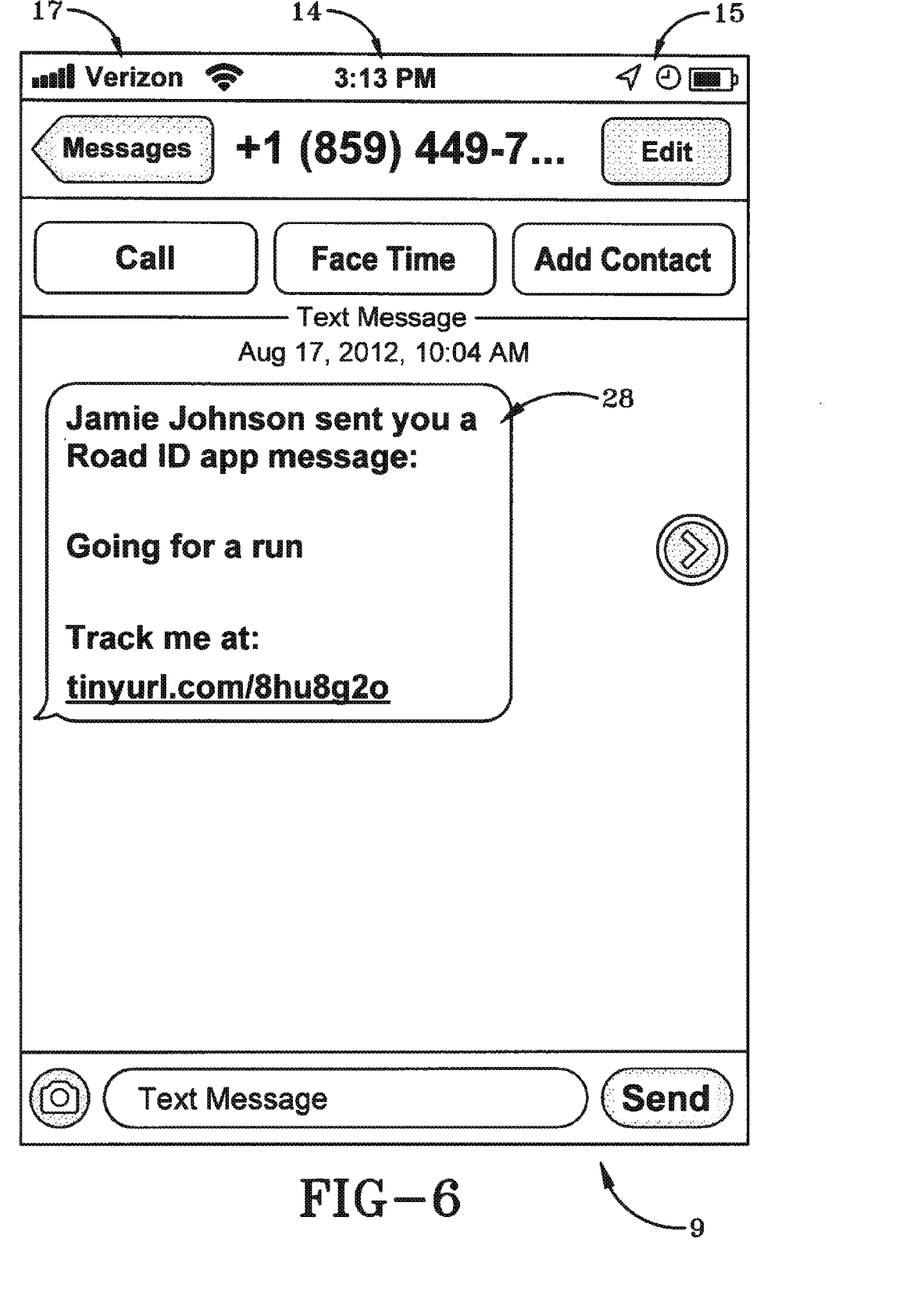
FIG. 6 illustrates an example message generated by the Road ID application that the person is going to begin traveling the path.

After creating an account, a user of the Road ID application (app) 3 can select to use one or both of its novel features of creating an electronic breadcrumb (eCrumb) or using its locked screen feature. Upon a user selecting to create an eCrumb, the Road ID app 3 will display an example eCrumb setup screen 22 similar to FIG. 4 on the electronic device 1. Some of the key features of this screen 22 include a "set length of activity" button 21 used for setting a length of an activity that may be specified in hours and minutes. Pressing a "Select a quick message" button 23 can cause the Road ID app 3 to display a quick message screen 24 similar to the example screen 24 of FIG. 5 to be displayed. The user can use this screen 24 to select a predetermined quick message through buttons 25A-D or to create a new custom message through custom message button 27. As can be seen from example FIG. 5, these buttons can be used by the user of the electronic device 1 to generate a message indicating what kind of activity the user is to begin and this message can be sent to remote device(s) 9, 11 of family members and friends of the user. Example FIG. 6 illustrates an example quick message sent to a remote device 9 that is a smartphone using the Verizon Wireless™ telephone system although any suitable wireless communication system may be used.

An "Add Phone or Email" button 29 (FIG. 4) can be used by the user to take the user to a screen where the user can add phone numbers of friends and family. On that screen, new numbers and emails can be added as understood by those of ordinary skill in this art. In the sample embodiment, a pair of on/off toggle buttons 31A-B (FIG. 4) can be used to turn on or off the eCrumb Location and Stationary Warning functions. In some embodiments, when the eCrumb location button 31A is activated, notified friends and family can receive periodic update messages indicating the location of the user of the electronic device 1 running the Road ID app 3. When the Stationary Warning button 31B is activated, these same friends and family or a portion thereof will receive an alarm indication when the user of the electronic device 1 does not move to a different location for a predetermined amount of time or distance. For example, if the user has not moved out of a 10 to 20 foot radius in about 3 to 10 minutes, a warning message will be sent to remote device(s) 9, 11 of family members and friends of the user and indicating his location on a map.

Figure 7:
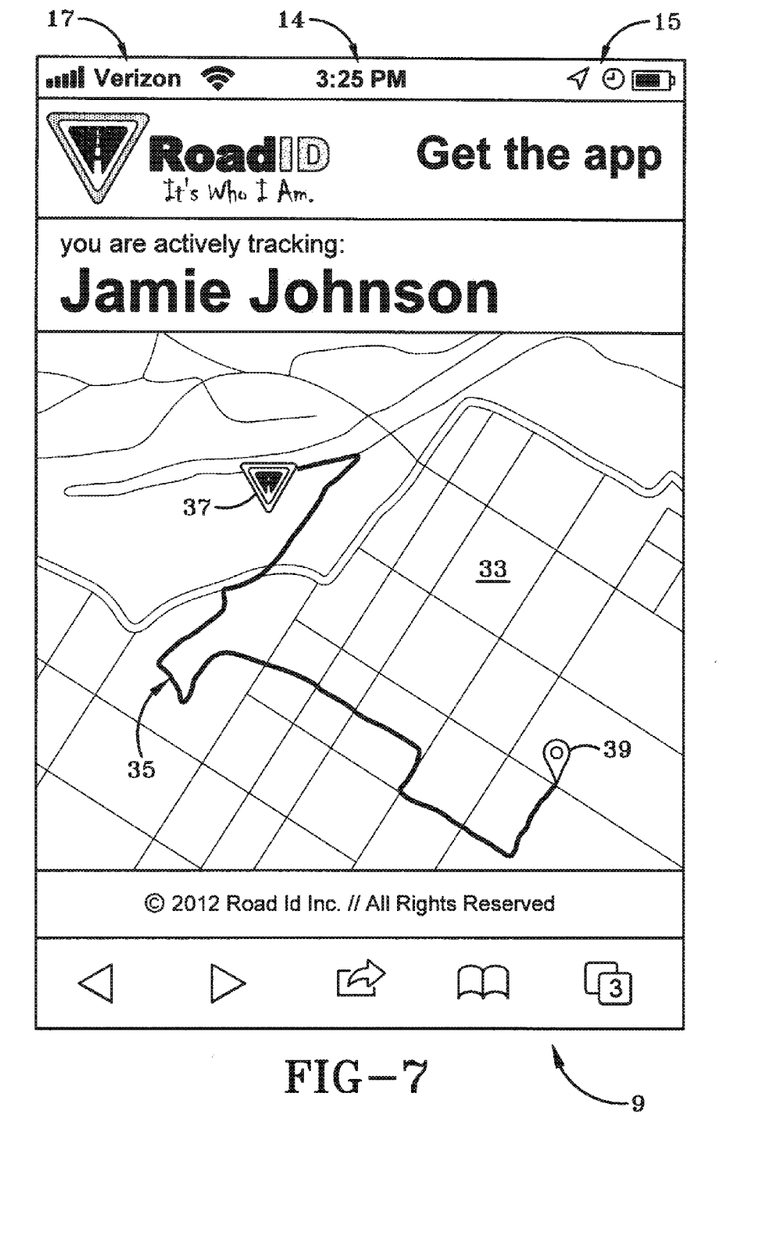
FIG. 7 illustrates an example map/route message generated by the Road ID application indicating where the person is on the path.

For example, when eCrumb is activated, the electronic device 1 can send a message to the remote devices 9, 10 that places a marker on a map 33 (FIG. 7) at the remote devices 9, 10 indicating where the electronic device 1 is located. As the users moves with the electronic device 1 the route 35 of the electronic device 1 is traced on the map 33 as illustrated in example FIG. 9. A current location marker 37 can be used to mark a current location of the user and a finish marker 39 can be used to mark a desired ending location where the journey would be completed. This route 35 and map 33 combination can be sent to remote devices 9, 11 of friends and/or family when the user begins the route 35 and, in some embodiments, periodically while he/she travels the route 35. In some embodiments, the map 33 can be zoomed into to see street and other location information or it can be zoomed out of to see what progress has been made during the activity. When the Road ID app 3 is started and the start message is sent, the Road ID app 3 will internally periodically update and keep track of the location of the user carrying the electronic device 1. The tracking can be performed by the processor 5 or other tracking logic or a combination of the processor 5 and the tracking logic. The processor 5 and/or tracking logic can use global position system (GPS) technology which is accurate to within feet or the tracking can be done in another way as understood by those of ordinary skill in the art. In the sample embodiment, a tracking map/location is updated about every minute but other update times can be used. In other configurations it is possible that the update time interval can be user specified as long as it is not greater than a maximum time value.

When generating a stationary warning, the Road ID app 3 can first generate a warning message to be displayed on the electronic device 1. For example, if the user has not moved from a radius of about 15 feet for five minutes, for example, the message "You have not moved from your location in 5 minutes" may be displayed along with the warning "Unless you cancel this alert within 60 seconds, an emergency message will be sent to your eCrumb contacts". In addition or alternatively to the warning message, audio warning(s), vibration of the electrical device 1, and LED and/or other optical and the like warnings can be generated. Of course, a different radius than 15 feet can be used and different times than 5 minutes and 60 seconds can be used. A countdown timer can also count down the 60 seconds and display this countdown value on the electronic device 1. The Road ID app 3 can send the message to any type of remote device 9, 11 that can be a laptop, mobile phone, iPad, computer and the like and the remote device 9, 11 does not have to be running a version of the Road ID app 3 to receive and display the message.

Figure 8:
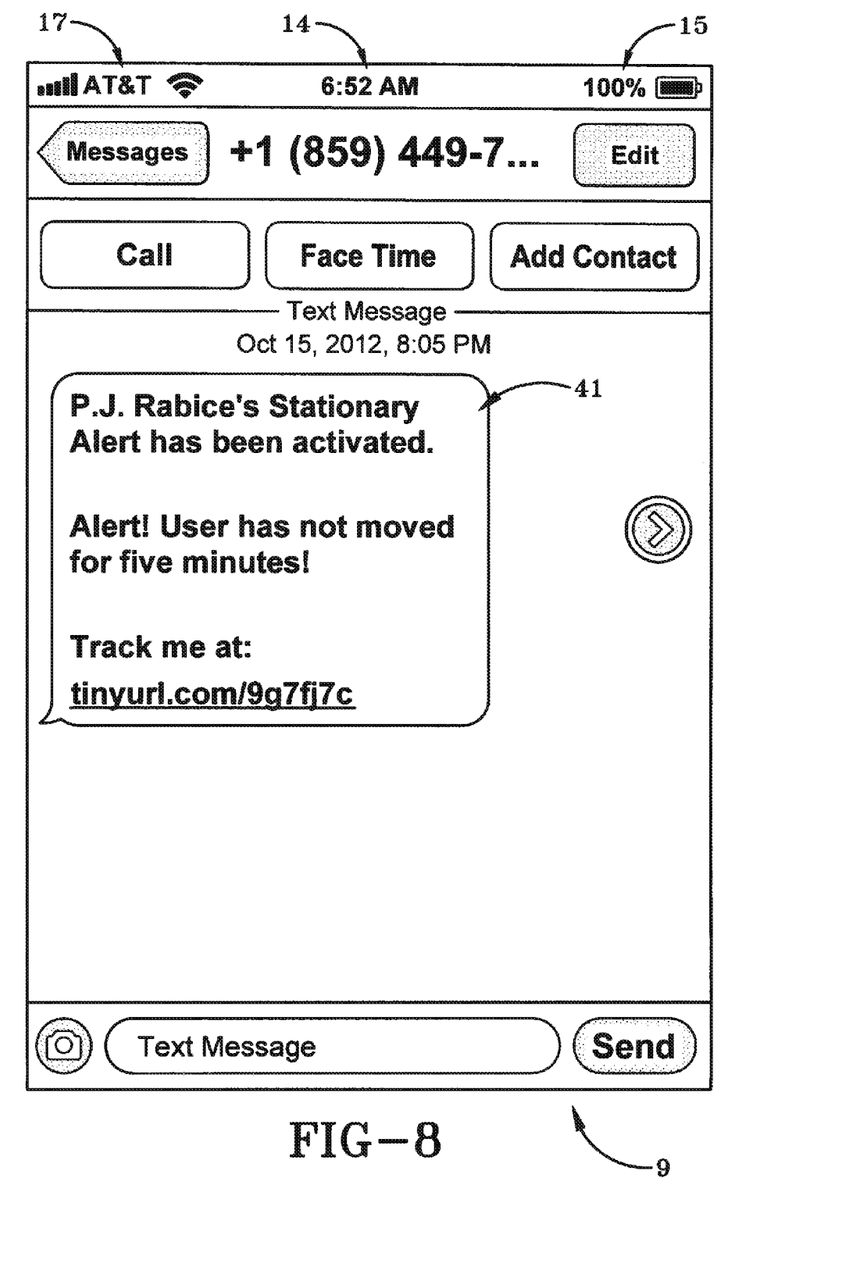
FIG. 8 illustrates an example stationary alert message generated by the Road ID application indicating that the person has not recently moved.

If the message is not acknowledged within the time period, the Road ID app 3 then sends a stationary alert message 41 similar to the one illustrated in example FIG. 8. In some embodiments, the Road ID app 3 can even send map data with the stationary message so that the contacts of the user can determine the user's stationary location to more quickly locate the user and provide any needed assistance. The map data can be link or uniform resource locator (URL) to online maps so that minimal map data needs to be transmitted.

As mentioned above, in addition to the Road ID app 3 being used with its eCrumb features, it can also be used in a "locked screen" mode. To use the locked screen mode, the user enters contacts information and emergency medical information into a locked screen so that first responders can more quickly evaluate an emergency medical condition and respond. A user may be able instruct the Road ID app 3 to lock the screen before beginning an athletic or other strenuous activity so that if they become disabled, first responders can quickly and easily read the emergency medical information.

Figure 9:
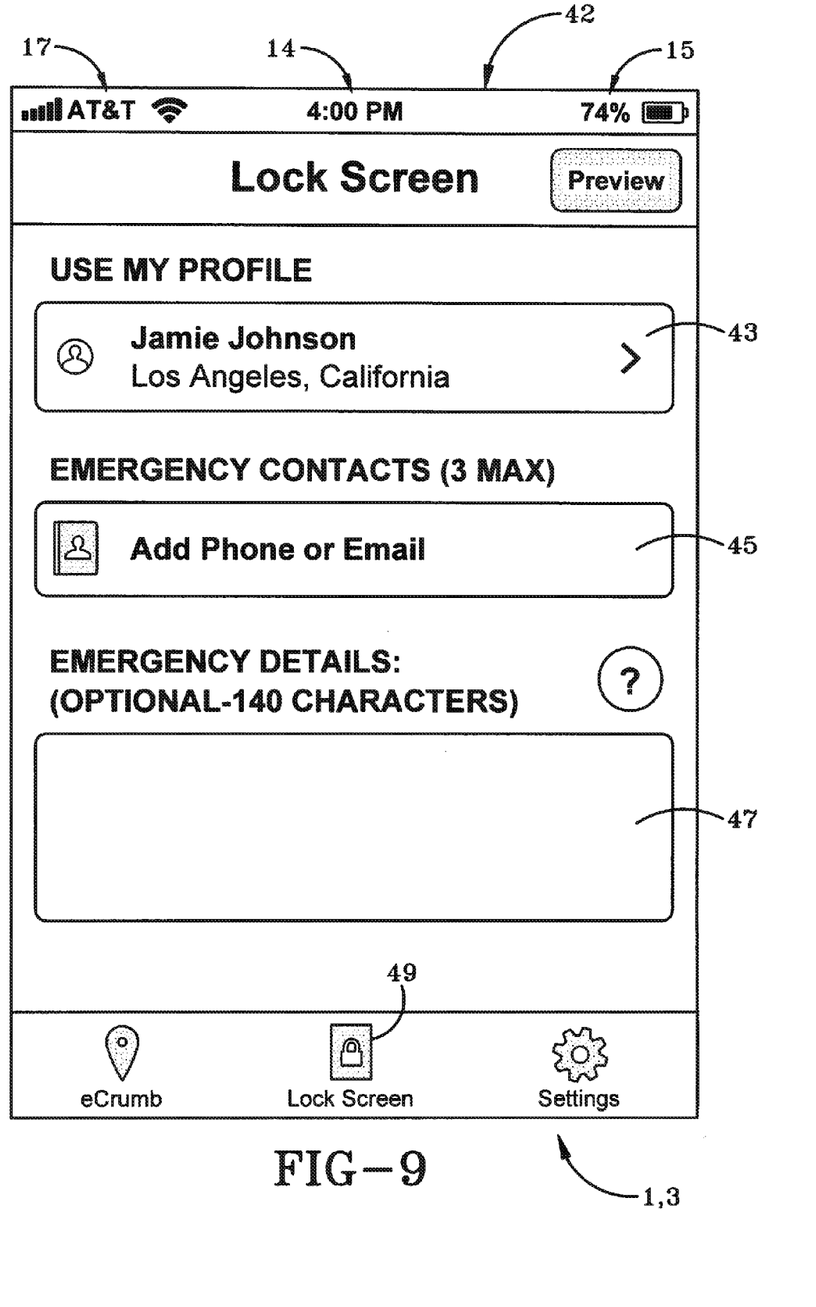
FIG. 9 illustrates an example screen for inputting various emergency information when using the lock screen mode of the Road ID application.

The Road ID app 3 allows the user to enter this information by causing a locked screen interface 42 similar to the one illustrated in FIG. 9 to be displayed on the electronic device 1. This interface 42 includes a personal information button 43 that can be used to enter personal information that may include the profile information as illustrated in FIG. 3 discussed above and can also include medically related profile information. A contact add phone or email button 45 is also provided for adding contact phones and/or email address and may operate similar to the add phone or email button 29 discussed above with reference to FIG. 4. An emergency detail window 47 provides a way for the user to input a personal emergency message to be displayed on the screen when it is locked. In another embodiment, the Road ID app 3 can provided a link to a remote site containing medical information allowing one to access medical information through that link.

Figure 10:
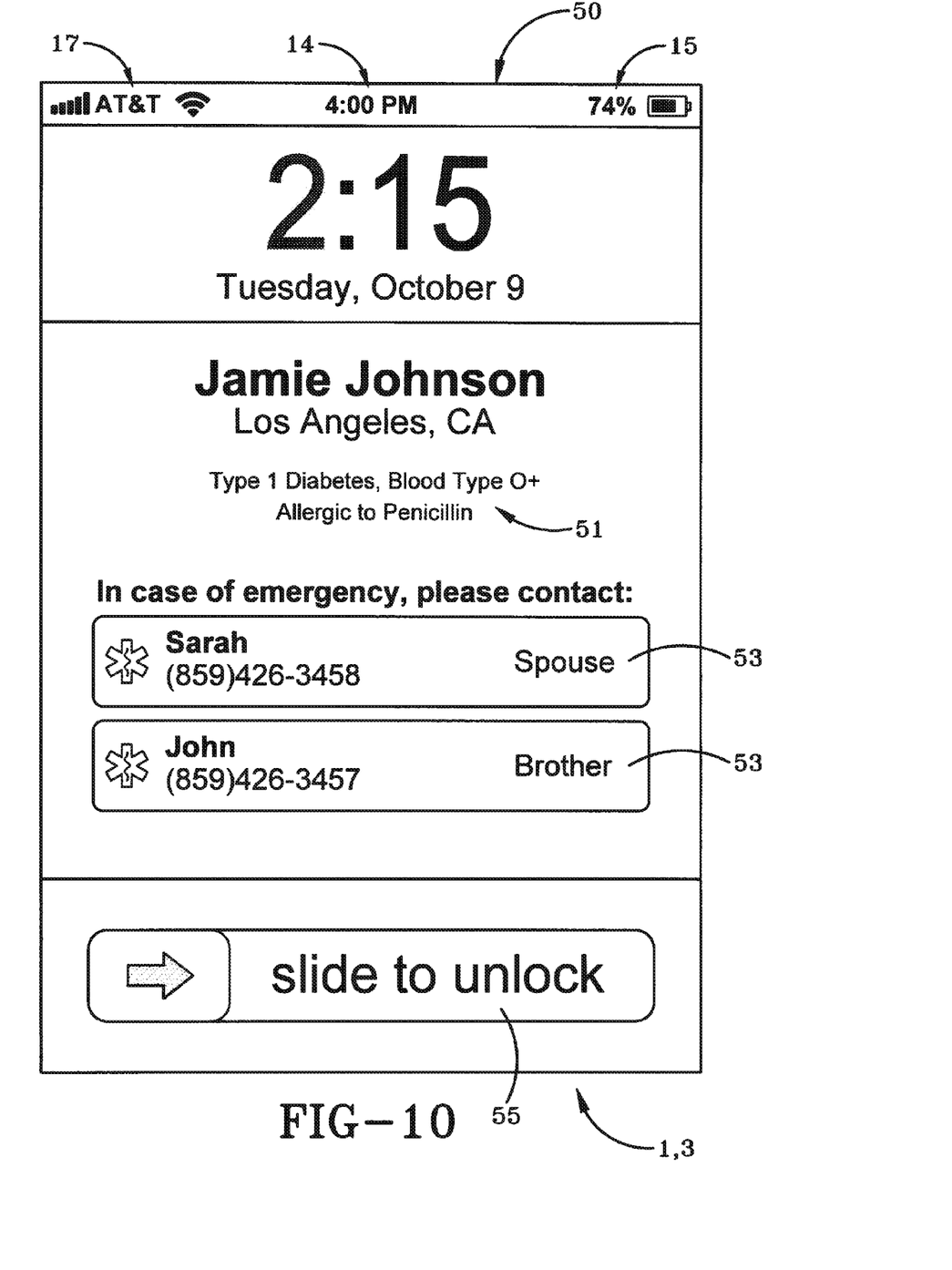
FIG. 10 illustrates an example locked screen when using the lock screen mode of the Road ID application.

An example locked screen 50 in locked screen mode is illustrated in FIG. 10. As can be seen here, the date and time can be displayed along with the users name and address. An example message 51 indicating "Type 1 Diabetes, Blood Type O+, Allergic to Penicillin" is displayed along with the names of and phone numbers of two contacts 53. A slide bar 55 is provided on the bottom of the screen to provide a way to later unlock the screen.

Example methods may be better appreciated with reference to a flow diagram. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 11:
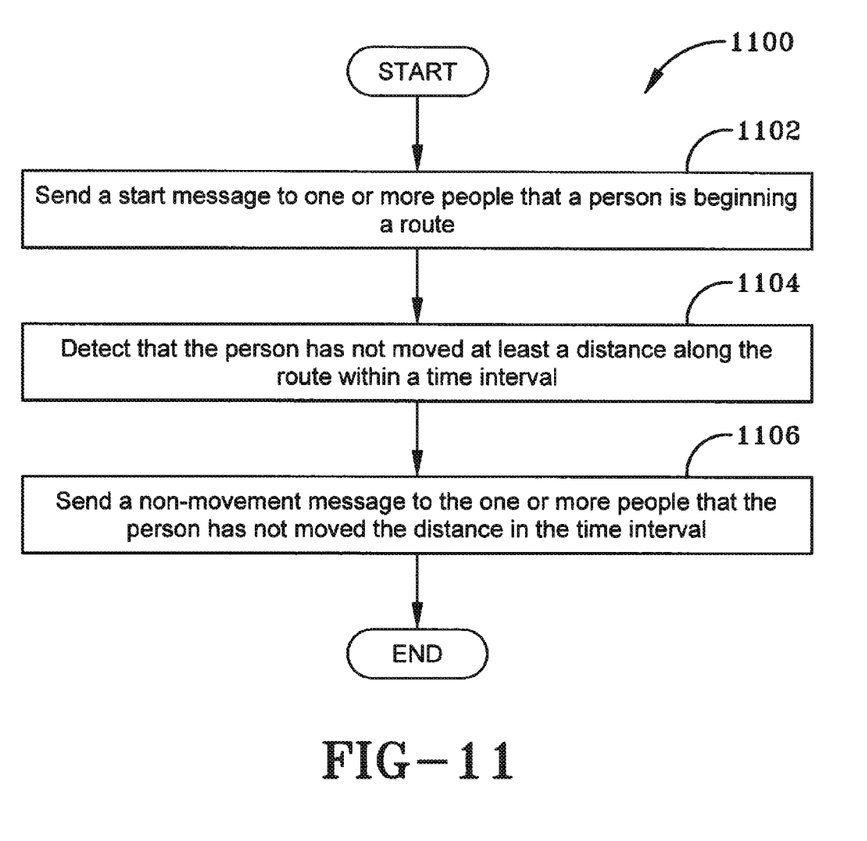
FIG. 11 illustrates an embodiment of a method for following a person to travel a route from a start point to an end point.

FIG. 11 illustrates a method 1100 of following a person to travel a route from a start point to an end point. The method 1100 begins, at 1102, by sending a start message to one or more people indicating that the person is beginning the route and indicating how long the trip should take. A detection is made, at 1104, that the person has not moved at least a distance along the route in a time interval. A non-movement message is then sent to the one or more people, at 1106, indicating that the person has not moved the distance in the time interval along with the person's location. Prior to sending the non-movement message, the method 1100 can provide an option for the person to cancel the non-movement message. The method 1100 may also track the person as discussed above after the non-movement message is sent in case there has been foul play so that friends and family holding remote devices can continue to receive updates of where the person is located. In some embodiments, the method 1100 is performed in a handheld electronic device.

Figure 12:
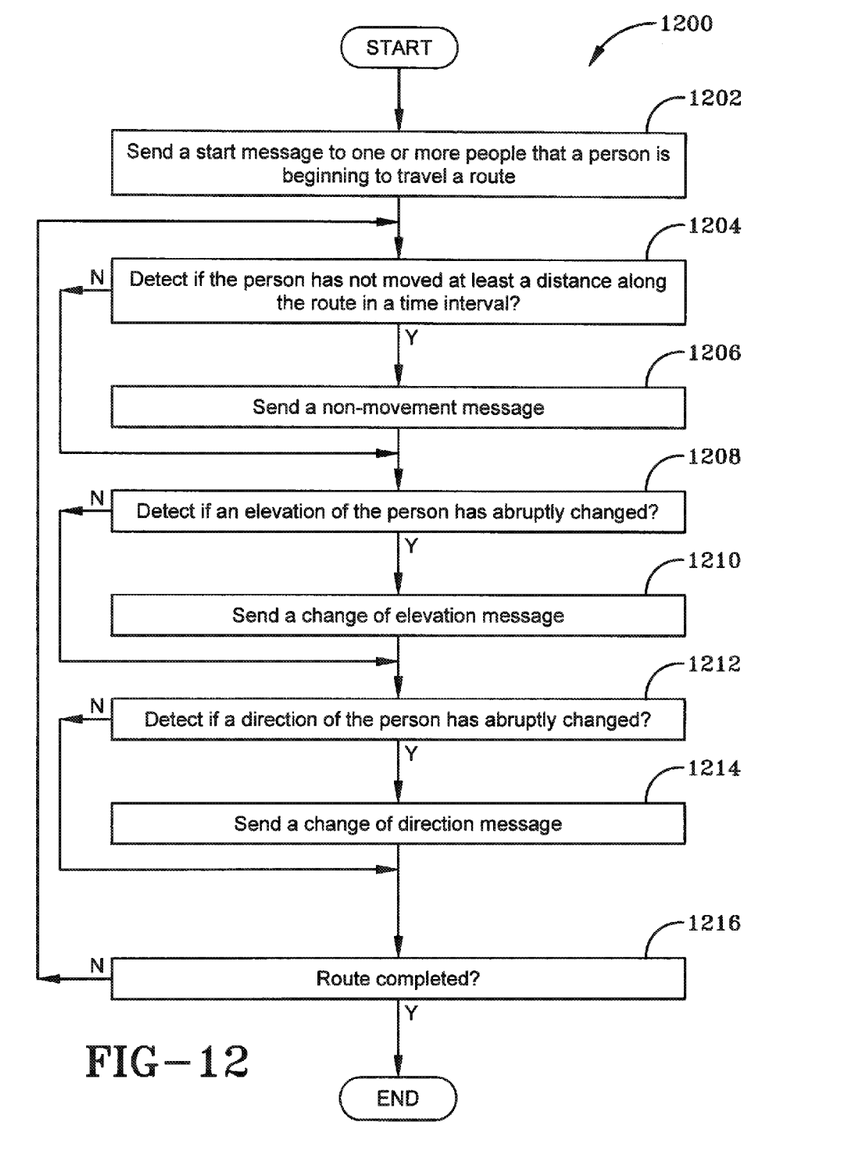
FIG. 12 illustrates another embodiment of a method for following a person to travel a route.

FIG. 12 illustrates another example embodiment of a method 1200 of tracking someone while they travel a route. The method 1200 begins by sending, at 1202, a start message to other people that a person is beginning to travel a route. As discussed above, this can be done by the person starting the route to cause an electronic device they are carrying to send a start message. While the person is traveling the route, the method 1200 can detect, at 1204, that the person has not moved at least a distance along the route in a time interval. When this occurs, a non-movement message is sent, at 1206, to the people tracking the person that the person has not moved the distance in the time interval. A detection is made if the elevation of the person has abruptly changed, at 1208. An abrupt elevation change can be different values but in one sample embodiment it is five feet in less than 1 second. If the elevation has abruptly changed, then a change of elevation message is sent to the people him, at 1210, indicating that the person has had an abruptly elevation change. At 1212, at detection is made if the person has made an abrupt direction of movement change. An abrupt direction of movement change in one example embodiment is direction of travel that changed by more than 100 degrees. When this occurs and abrupt direction of movement change message is sent to the people tracking the person's route, at 1214, indicating the abrupt direction of movement change. Next, a determination is made, at 1216, if the route has been completed. If so, the method 1200 ends, otherwise flow returns to step 1204.

Other configurations of this example method 1200 can have other useful features. For example, after generating the non-movement message, the method 1200 can provide an option for the person to cancel the non-movement message for a certain length of time before the message is sent. In some configurations the method 1200 can track the person as discussed above before and/or after sending the non-movement message. Portions or all of the method 1200 can be performed in a handheld electronic device. When performed in a handheld device, the method 1200 can receive voice command(s) at the electronic device and the electronic device can be controlled based on the voice command(s). The different message(s) can be sent the people the person at least partially over a wireless network. In some example embodiments, the method 1200 can prompt the person traveling the route to set a length of time to travel the route. The method 1200 can later send a route not complete message when the route is not completed and this length of time has been exceeded.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method comprising:
   receiving a selection of one or more people to notify that a person intends to travel a route; where the selection is based on the person's personal preference;
   receiving via user input contact information for an electronic device for the one or more selected people into a portable device to be carried by the person when travelling the route;
   sending a start message to the electronic device of the selected one or more people that the person is beginning to travel the route;
   detecting via the portable device carried by the person that the person has not moved at least a predetermined distance along the route for a predetermined time interval;
   initiating a countdown timer on the portable device when the portable device detects that the person has not moved the distance along the route for the predetermined time interval;
   providing the person an option to disable the countdown timer from the portable device;
   sending a non-movement message to the selected one or more people that the person has not moved the predetermined distance in the predetermined time interval when the person fails to disable the countdown timer, wherein the non-movement message includes a marker on a map associated with the location of the portable device so as to be viewable on the electronic device for the one or more selected people, and wherein the route is traced on the map to identify the route the person actually traveled and not a predicted route and sending the actual route to the one or more selected people.

2. The method of claim 1 further comprising:
   detecting that an elevation of the portable device has abruptly changed; and
   sending a change of elevation message to the selected one or more people that the portable device has had an abruptly elevation change.

3. The method of claim 1 further comprising:
   detecting that a direction of the portable device has abruptly changed; and
   sending a change of direction message to the selected one or more people that the person has abruptly changed the direction.

4. The method of claim 1 further comprising:
   detecting that the portable device is moving but has not moved the predetermined distance that is greater than zero and up to about 50 feet in the predetermined time interval; and
   sending the not moved a predetermined distance message to the selected one or more people that the person has not moved the predetermined distance.

5. The method of claim 1 further comprising:
   detecting that the person is about to begin the route; and wherein the sending the start message is responsive to the detecting that the person is about to begin the route.

6. The method of claim 1 further comprising:
   tracking the portable device after sending the non-movement message to the selected one or more people is sent.

7. The method of claim 1 wherein the method is performed in the portable device carried by the person.

8. The method of claim 7 further comprising:
   receiving a voice command at the portable device carried by the person; and
   controlling the portable device carried by the person based on the voice command.

9. The method of claim 1 further comprising:
   sending the non-movement message to the selected one or more people at least partially over a wireless network.

10. The method of claim 1 further comprising:
    prompting on a display with graphics asking the person to input the one or more people to be notified that the person is to begin the route.

11. The method of claim 1 further comprising:
    setting length of time to travel the route; and
    sending the route not complete message when the route is not completed when the length of time has been exceeded.

12. The method of claim 1 further comprising:
    notifying the person that the non-movement message will be sent unless the person cancels the non-movement messages within a predetermined cancel messages time.

13. The method as defined in claim 12, further comprising:
    starting a countdown timer on the portable device once the notification is sent.

14. The method of claim 1 further comprising:
    displaying emergency medical information about the person on the electronic device of the selected one or more people when the person carrying the portable device has not moved the at least the predetermined distance along the route in the predetermined time interval.

15. The method of claim 14 wherein the emergency medical information further comprises:
    at least one of a group of: blood type, emergency contacts, allergies to medicines and an internet link to medical information.

16. The method of claim 1 further comprising:
    sending to the selected one or more people a pointer to the map of the route that the person is going to travel.

17. The method of claim 1 further comprising:
displaying one of emergency information and a link to medical information on a screen of an electronic device of the selected one or more people.

18. A portable device for tracking the person along the selected route in accordance with the method set out in claim 1, wherein the portable device is:
an electronic portable device that is worn or carried by the person and further comprises;
communications logic to notify the selected one or more people that the person is beginning a journey along the route;
a detector to determine if the electronic portable device has at least one of: not moved the predetermined distance within a time window, movement has abruptly altered, and elevation of the device has abruptly changed;
notification logic to send the message to the selected one or more people upon the detector determining the electronic portable device has at least one of: said not moved the predetermined distance within the time window, said movement has abruptly altered, a force of impact of the electronic device and the elevation of the device has abruptly changed.

19. The system device of claim 18 further comprising:
tracking logic adapted to track the person during the journey.

20. The device of claim 18 wherein the predetermined time interval is 15 minutes or less and the predetermined distance is within a radius of 50 feet or less.

21. The method as defined in claim 1, further comprising:
sending the map identifying the person's stationary location when the non-movement message is sent.

22. The method as defined in claim 1, further comprising:
tracing the movement of the portable device along the route on the map.

23. A method of tracking a person along a route to be traveled, said method comprising:
receiving a selection of one or more people to notify that the person intends to travel the route; where the selection of the one or more people is based on the person's personal preference;
receiving via user input contact information for the one or more selected people into a portable device to be carried or worn by the person when travelling the route;
sending a start message to the selected one or more people that the person is beginning to travel the route;
detecting via the portable device that the person is experiencing a personal emergency and requires assistance; wherein the detection includes determining that the portable device has not traveled a predetermined distance along a section of the route in a predetermined time;
initiating a countdown timer on the portable device when the portable device detects that the person has not moved the predetermined distance along the route for the predetermined time interval;
providing the person an option to disable the countdown timer from the portable device; and
sending a message from the portable device to the selected one or more people that the person requires assistance when the person fails to disable the countdown timer, wherein the message includes a marker on a map associated with the location of the portable device so as to be viewable on the electronic device for the one or more selected people, and wherein the route is traced on the map to identify the route the person actually traveled and not a predicted route and sending the actual route to the one or more selected people.

* * * * *